United States Patent
Cischke et al.

(10) Patent No.: US 9,409,544 B1
(45) Date of Patent: Aug. 9, 2016

(54) ACTIVE BOLSTER STRESS RELIEF VENTS FOR FAILSAFE WELD PROTECTION

(71) Applicant: FORD GLOBAL TECHNOLOGIES, LLC, Dearborn, MI (US)

(72) Inventors: Kaitlin M. Cischke, Bloomfield Hills, MI (US); Stacey H. Raines, Ypsilanti, MI (US); Nicholas A. Mazzocchi, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/925,155

(22) Filed: Oct. 28, 2015

(51) Int. Cl.
| B60R 21/30 | (2006.01) |
| B60R 21/239 | (2006.01) |
| B60R 21/2342 | (2011.01) |

(52) U.S. Cl.
CPC .......... *B60R 21/239* (2013.01); *B60R 21/2342* (2013.01); *B60R 2021/2395* (2013.01)

(58) Field of Classification Search
CPC  B60R 21/206; B60R 21/205; B60R 21/2165; B60R 2021/21654
USPC .................................. 280/739, 748, 749, 751
See application file for complete search history.

(56) References Cited

U.S. PATENT DOCUMENTS

| 6,213,497 | B1* | 4/2001 | Spencer ............... | B60R 21/045 |
| | | | | 280/730.1 |
| 8,328,233 | B2 | 12/2012 | Kalisz | |
| 8,454,054 | B1 | 6/2013 | Raines | |
| 8,931,803 | B2 | 1/2015 | Roychoudhury | |
| 8,936,273 | B1 | 1/2015 | Raines et al. | |
| 8,973,942 | B1 | 3/2015 | Raines et al. | |
| 9,156,423 | B1* | 10/2015 | Aselage ............... | B60R 21/239 |
| 9,260,075 | B2* | 2/2016 | Young .................. | B60R 21/276 |
| 2002/0125691 | A1* | 9/2002 | Conlee ................. | B60R 21/045 |
| | | | | 280/730.1 |
| 2012/0112439 | A1* | 5/2012 | Roychoudhury ....... | B60R 21/02 |
| | | | | 280/728.3 |
| 2012/0267878 | A1* | 10/2012 | Kalisz .................. | B60R 13/02 |
| | | | | 280/728.2 |

* cited by examiner

*Primary Examiner* — Toan To
(74) *Attorney, Agent, or Firm* — Vichit Chea; MacMillan, Sobanski & Todd, LLC (57) ABSTRACT

An active bolster mounts at an interior trim surface of a passenger compartment in an automotive vehicle. A plastic front wall deploys in a deployment direction toward a passenger in the passenger compartment. A plastic expandable bladder member is joined along an outer perimeter with the front wall by a weld seam to form a bladder. The weld seam has a nominal separation pressure. An inflator couples an inflation gas to inflate the bladder in response to a crash event. The bladder member includes a plurality of vent openings configured to regulate an inflation pressure of the inflation gas during an impact according to a passenger restraint profile. The bladder member further includes at least one stress relief vent comprising a frangible tear seam partially cut into the bladder member configured to tear open at a predetermined pressure between the passenger restraint profile and the nominal separation pressure.

13 Claims, 7 Drawing Sheets

ACTIVE BOLSTER STRESS RELIEF VENTS FOR FAILSAFE WELD PROTECTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels joined along a hot weld seam.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or trim panel that faces a vehicle occupant attached to a back wall or bladder member along a sealed periphery. The bladder member is further attached to a fixed reaction surface such as an instrument panel, door liner, or frame element. One or both of the walls is deformable in order to provide an expandable, inflatable bladder. For example, the bladder member may have a pleated (i.e., accordion-like) region that straightens out during inflation. The walls are initially spaced apart by a small amount when in their pre-deployment, non-inflated condition. This allows ingress of the inflation gas in a manner that achieves an even inflation across the trim panel.

The front and back walls of a typical bladder for an active bolster are comprised of molded thermoplastics such as polyethylene, polyolefin, or PVC. They are typically injection molded but can also be blow molded. When formed separately, the front and back walls must be hermetically joined around their periphery in order to form the inflatable bladder. The joint must be strong to resist separation that could result from high inflation pressures during inflation and that result when a passenger impacts the bolster. The peripheral seal is formed by hot welding, for example.

It is known that in order to optimize the dissipation of energy when an occupant contacts an active bolster, inflation gas should be vented to allow a controlled collapse of the bladder that safely decelerates the impacting occupant. Venting locations have been disclosed on the central, flat areas of the bladder wall facing the front wall, in the pleated baffle region of the bladder wall, and in welding towers that attach the bladder wall to a reaction surface, for example. It has also been suggested that an active vent can be placed in close proximity to local regions where the stresses of inflation forces may create a highest probability of weld failure.

A particular bolster design adopts various design features such as material types, weld interface, baffle size and placement, and vent configurations to obtain a desired restraint performance and weld reliability. Such a design must necessarily be based on corresponding assumptions such as a range of expected impact loads and a range of pressures of the inflation gas to be delivered by an inflator. In the event that one of these assumptions is violated (e.g., an inflator delivers a greater volume and/or pressure outside its specified range), excessive stress on the weld seam may still cause a weld separation.

SUMMARY OF THE INVENTION

In one aspect of the invention, an active bolster mounts at an interior trim surface of a passenger compartment in an automotive vehicle. A plastic-molded front wall deploys in a deployment direction toward a passenger in the passenger compartment. A plastic-molded expandable bladder member is joined along an outer perimeter with the front wall by a weld seam to form an inflatable bladder. The weld seam has a nominal separation pressure. An inflator couples an inflation gas into the inflatable bladder in response to a crash event of the vehicle. The bladder member includes a plurality of vent openings configured to regulate an inflation pressure of the inflation gas during an impact according to a passenger restraint profile. The bladder member further includes at least one stress relief vent comprising a frangible tear seam partially cut into the bladder member configured to tear open at a predetermined pressure between the passenger restraint profile and the nominal separation pressure.

DETAILED DESCRIPTION OF PREFERRED EMBODIMENTS

Figure 1:
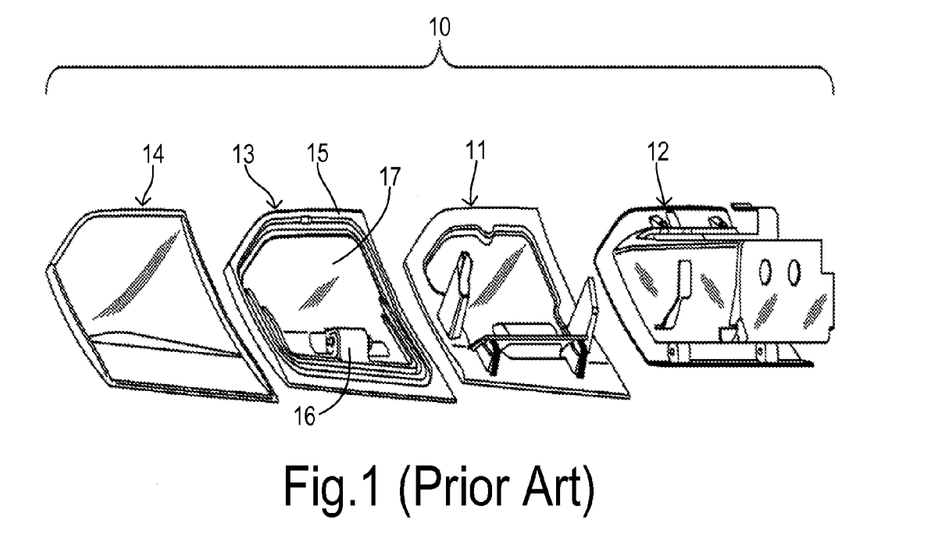
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual passenger riding in a corresponding seating position within a vehicle.

In this embodiment, base 11 is a door inner wall or liner that acts as a reaction surface for supporting an inflatable bladder formed by a back (bladder) wall 13 and a front (trim) wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
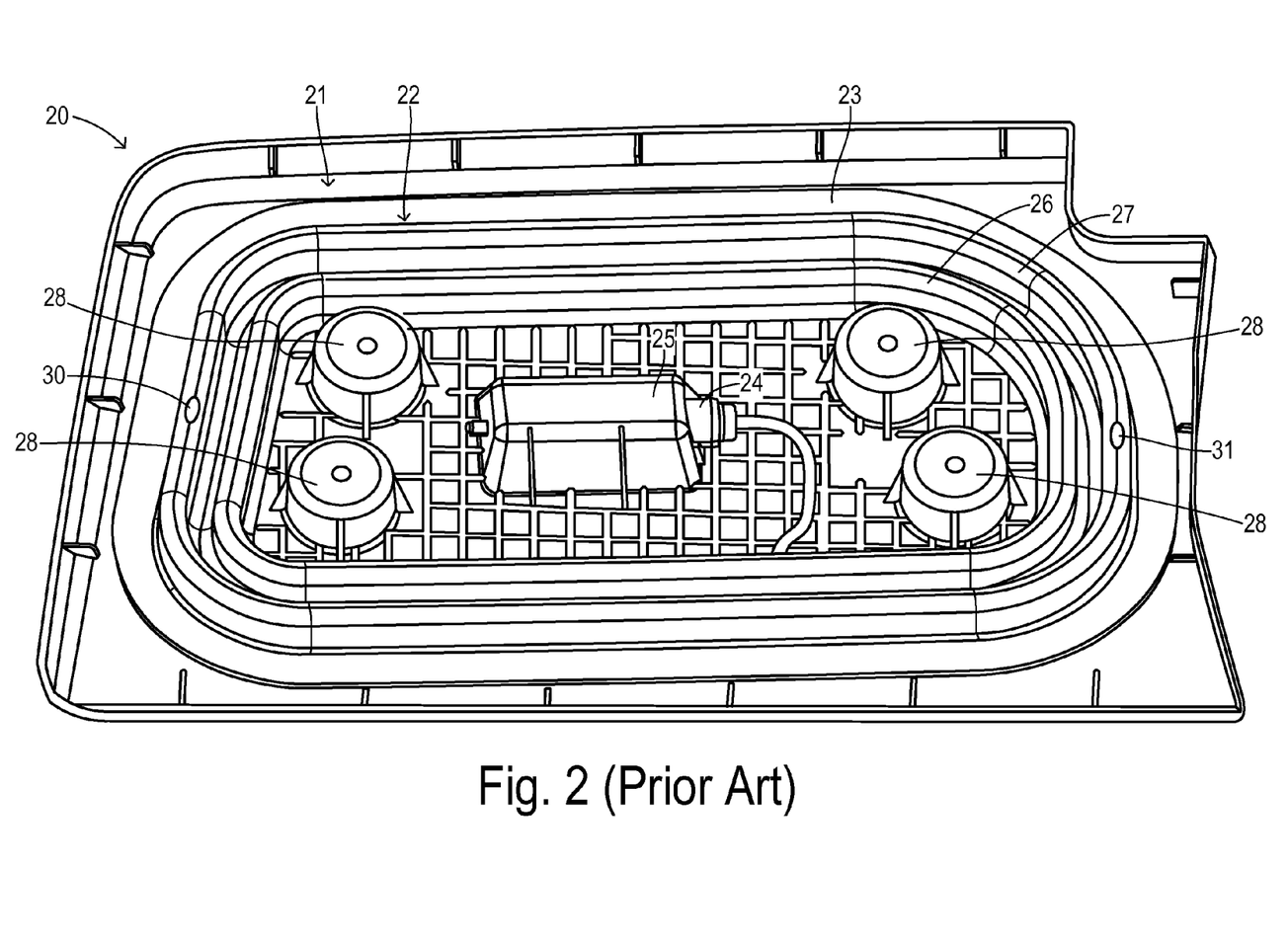
FIG. 2 is a rear perspective view of an inflatable bladder assembly of an active bolster.

FIG. 2 is a rear view of an inflatable bladder 20 for an active bolster. A plastic-molded front wall 21 overlies a plastic-molded, expandable back wall or bladder member 22. Wall 21 and bladder member 22 are joined around a closed perimeter region by hot welding a welding flange 23 of bladder member 22 to an inner surface of wall 21. The hot weld creates a hermetic seal to form an inflatable bladder having an open central volume between wall 21 and bladder member 22 to receive an inflation gas from an inflator 24 mounted in a recess 25 of bladder member 22 during a crash event. Bladder member 22 includes a plurality of pleats, such as 26 and 27, to accommodate the expansion of bladder member 22 during inflation. A plurality of attachment towers (i.e., bosses) 28 project from a central region of bladder member 22 disposed within baffle pleats 26 and 27. Towers 28 are used to mount bladder member 22 to a reaction surface (not shown). A pair of vent holes 30 and 31 penetrate through bladder member 22 at a peak of outermost pleat 27.

Figure 3:
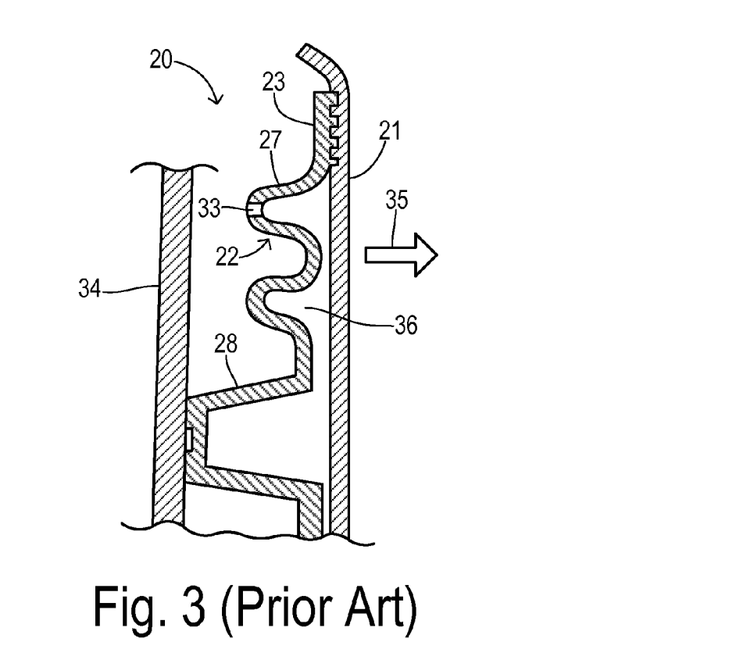
FIG. 3 is a side cross section showing a prior art active bolster assembly.

FIG. 3 shows a cross-section of bladder 20 as assembled onto a reaction wall 34. Attachment tower 28 may be hot welded to reaction wall 34, for example. Baffle pleat 27 is penetrated by a window opening 33 to provide a vent. During deployment as a result of an inflation gas being supplied into a bladder cavity 36, front trim wall 21 deploys in a deployment direction 35 toward a passenger in the passenger compartment of a vehicle.

Figure 4:
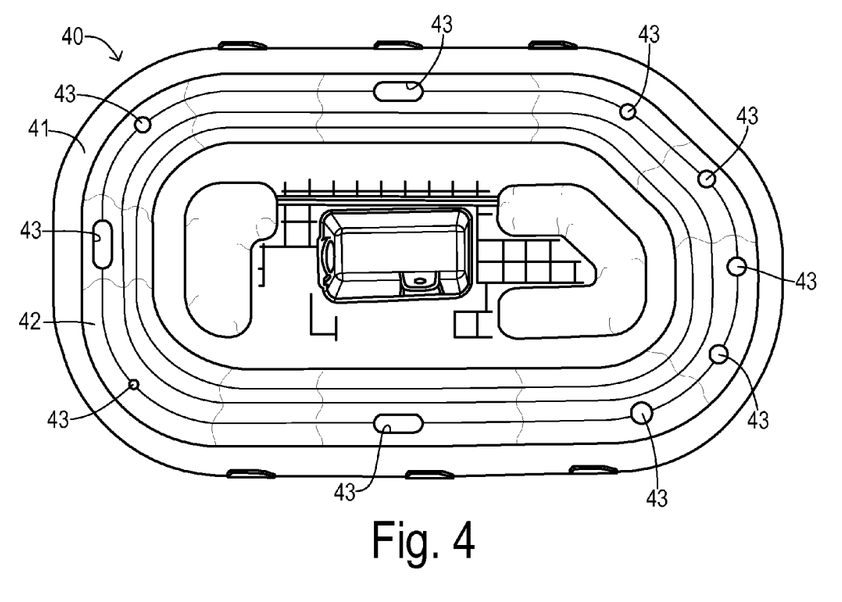
FIG. 4 is a rear, plan view of a bladder member with a plurality of vent openings distributed around an outermost pleat.

FIG. 4 shows a bladder member 40 with a peripheral welding flange 41 along a circumferential edge of bladder member 40. A pleated baffle includes a pleat 42 circumferentially disposed within welding flange 41 which unfolds during bolster deployment. A plurality of vent openings 43 may preferably be formed in pleat 42 since close proximity to the hot weld seam provides a better ability to reduce stress on the weld. The size and peripheral locations of vent openings 43 are configured according to various factors during engineering development. For example, vent capacity is selected to tune restraint forces across the bladder to provide a desired passenger restraint profile (e.g., timing and trajectory of initial inflation and then absorption of impact forces to provide a desirable deceleration of the impacting passenger). In addition, vent openings may be located near peak stress regions of the hot weld seam in order to provide some level of stress relief. A typical active bolster has an elongated shape extending horizontally in a vehicle, as shown in FIG. 4. Stress occurring along the weld seam as the bladder inflates and then receives an impact is modeled using computer aided engineering (CAE) tools as part of the conventional design process utilized by engineers. Most typically, the peak stresses occur along the longest straight sides of a weld seam, i.e., the top and bottom edges in FIG. 4 are the stress concentration areas. Vent openings can have a fixed cross section (i.e., constant flow coefficient) or can be active (i.e., presenting a variable flow coefficient during different stages of a deployment).

Figure 5:
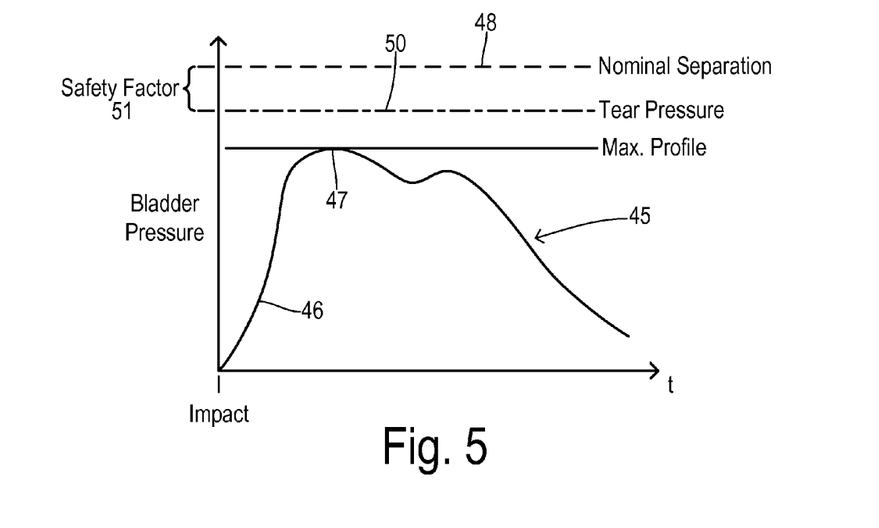
FIG. 5 is a plot representing a bladder pressure profile during a deployment.

FIG. 5 shows a bladder pressure curve 45 representing one typical bladder pressure trajectory resulting from an inflow of inflation gas from an inflator with subsequent venting through the vent openings that have been configured according to a desired passenger restraint profile. Bladder pressure initially builds at a region 46 when a crash event is detected and the inflator has been triggered. Pressure buildup reaches a maximum value 47. Throughout the deployment, the vent openings regulate the bladder inflation pressure such that an impacting passenger is decelerated at a desirable rate.

The present invention preferably identifies a maximum profile pressure corresponding to the greatest pressure expected to be created according to restraint profile assumptions such as the volume and rate of inflation gas to be generated by the known inflator component being utilized and passenger size and impact speeds. In accordance with good engineering practice, the maximum pressure expected according to the designed profile is less than a nominal weld seam separation pressure shown at 48 (i.e., the weld seam is designed to withstand the highest pressures expected for all the specified impact scenarios). The present invention is directed to providing an additional (i.e., failsafe) venting operation to protect a weld seam in the event that factors arise which violate the normal design assumptions, such as an unexpectedly high volume or rate of gas generation from an inflator or an impact force against an inflated bladder greater than the design criteria. The present invention introduces at least one stress relief vent comprising a frangible tear seam partially cut into the bladder member and configured to tear open at a predetermined pressure illustrated at a pressure level 50. Tear pressure 50 is selected to be at a predetermined pressure between the passenger restraint profile (i.e., the profile maximum) and the nominal weld separation pressure 48. Preferably, predetermined 50 is less than nominal weld separation pressure 48 by a predetermined safety factor 51. For example, safety factor 51 may be selected as an offset pressure value that provides a 6-sigma analytical safety factor.

Figure 6:
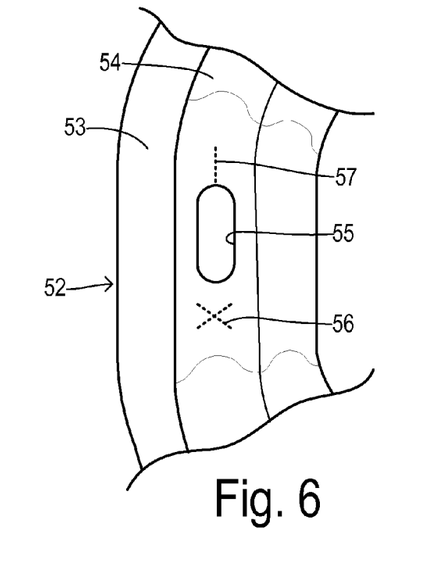
FIG. 6 is a partial outer view of a bladder member in the vicinity of a vent opening, with addition of stress relief vents comprised of frangible tear seams according to the present invention.
Figure 7:
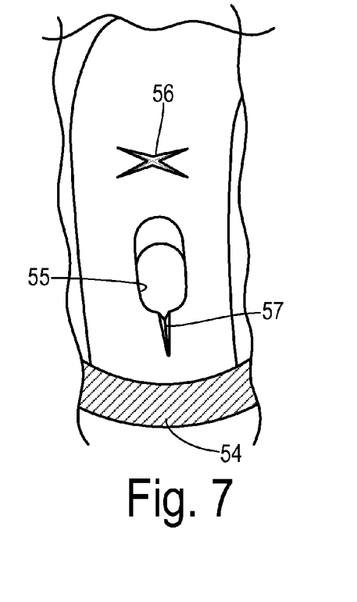
FIG. 7 is a partial inner view of the bladder member of FIG. 6 showing the tear seams in greater detail.

FIG. 6 shows a bladder member 52 with a welding flange 53 and a pleat 54. Vent opening 55 is placed in pleat 54 as a part of the normal venting capacity for a deployment in order to provide a desired passenger restraint profile. In order to provide stress relief in the event of the occurrence of a condition outside the normal design criteria, frangible tear seams for relief vents 56 and 57 are partially cut into an inner surface of bladder member 52 proximate to vent opening 55. Relief vent 56 comprises a frangible tear seam cut into the wall of pleat 54 having an X-shape and spaced a distance away from vent opening 56. Stress relief vent 57 includes a corresponding frangible tear seam cut into the wall of pleat 54 which extends laterally from and intersects with vent opening 55. The depth, size, and location for the frangible tear seams cut into bladder member 52 are configured such that the force created at the tear pressure will rupture the tear seams. These parameters may be determined analytically based on material properties of bladder member 52 and/or using empirical (e.g., prototype) testing. Since relief vent 57 extends laterally from vent opening 55, vent opening 55 can act as an initiator to facilitate the tearing process of the tear seam.

Figure 8:
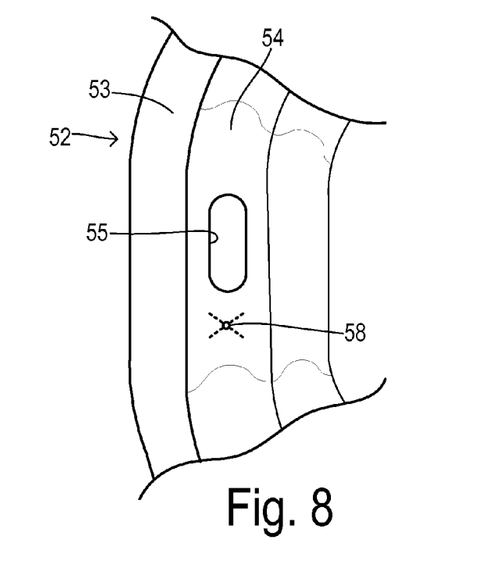
FIG. 8 is a partial outer view of a bladder member with a stress relief vent according to another embodiment of the present invention.
Figure 9:
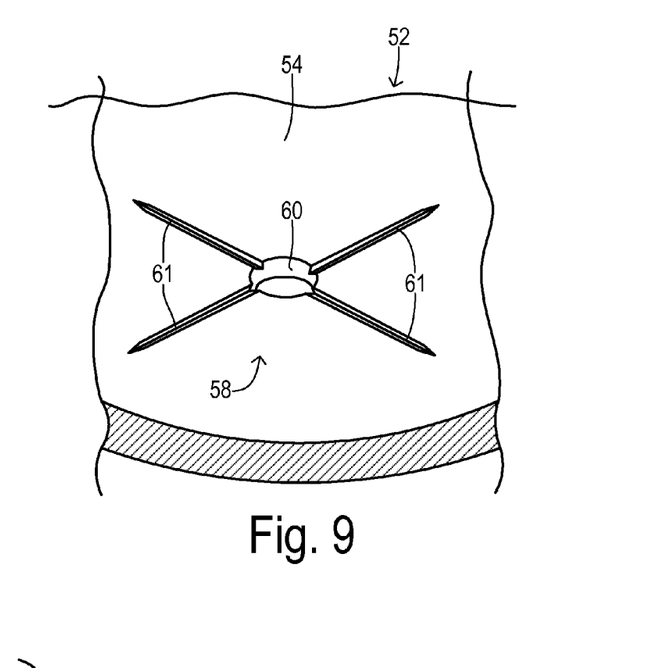
FIG. 9 is a partial inner view of the bladder member of FIG. 8 showing the tear seam in greater detail.

FIGS. 8 and 9 show an additional embodiment wherein a stress relief vent 58 is located on pleat 54 proximate vent opening 55. Stress relief event 58 comprises an initiator hole 60 penetrating the wall of pleat 54 and tear seams 61 cut into bladder member 52 with an X-shape and extending laterally from initiator hole 60. Initiator hole 60 may be sufficiently small that it has negligible effect on normal venting (i.e., would not contribute significantly to regulating the bladder inflation pressure during an impact according to a passenger restraint profile).

Figures 10, 11:
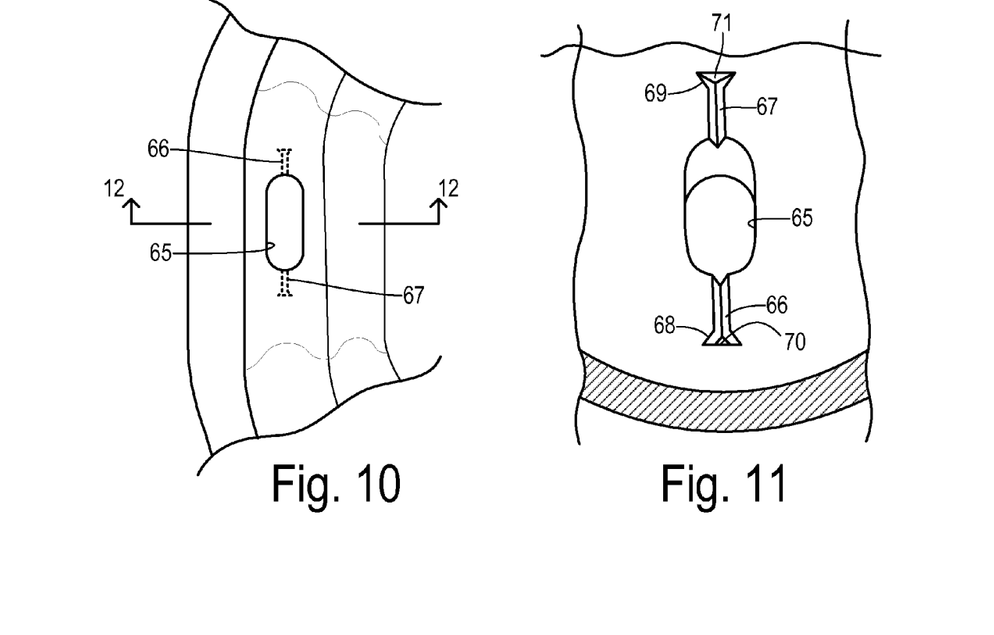
FIG. 10 is partial outer view of a bladder member with a stress relief vent according to yet another embodiment of the present invention.
FIG. 11 is a partial inner view of the bladder member of FIG. 10 showing the tear seam in greater detail.

FIGS. 10 and 11 show an additional embodiment wherein a vent opening 65 includes a pair of frangible tear seams 66 and 67 extending laterally from opposite sides of vent opening 65 along an inner surface of the bladder member. Tear seams 66 and 67 may include widening portions 68 and 69 with termination surfaces 70 and 71 which act as a tear stop to limit the amount of stress relief created during tearing, thereby avoiding excessive loss of restraint as a result of the operation of the stress relief vents.

Figure 12:
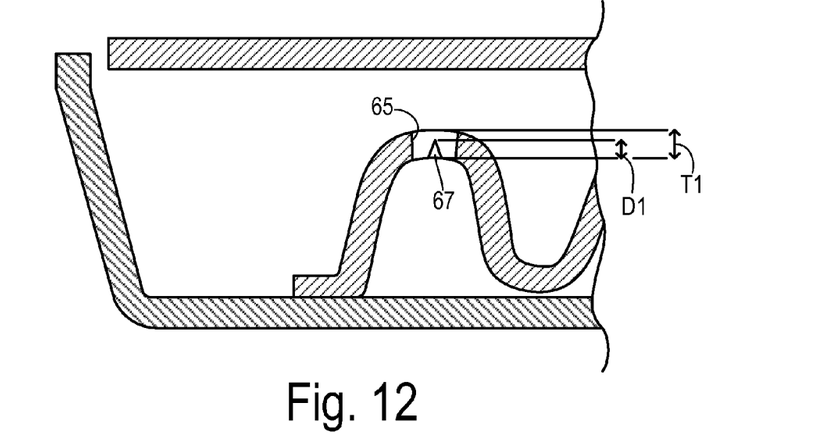
FIG. 12 is a cross section of the bladder member along line 12-12 of FIG. 10.

FIG. 12 is a cross section through vent opening 65 which illustrates a depth D1 of tear seam 67 penetrating into the full thickness T1 of the bladder member. The amount of wall thinning at D1 depends on the plastic materials and pressures involved.

Figure 13:
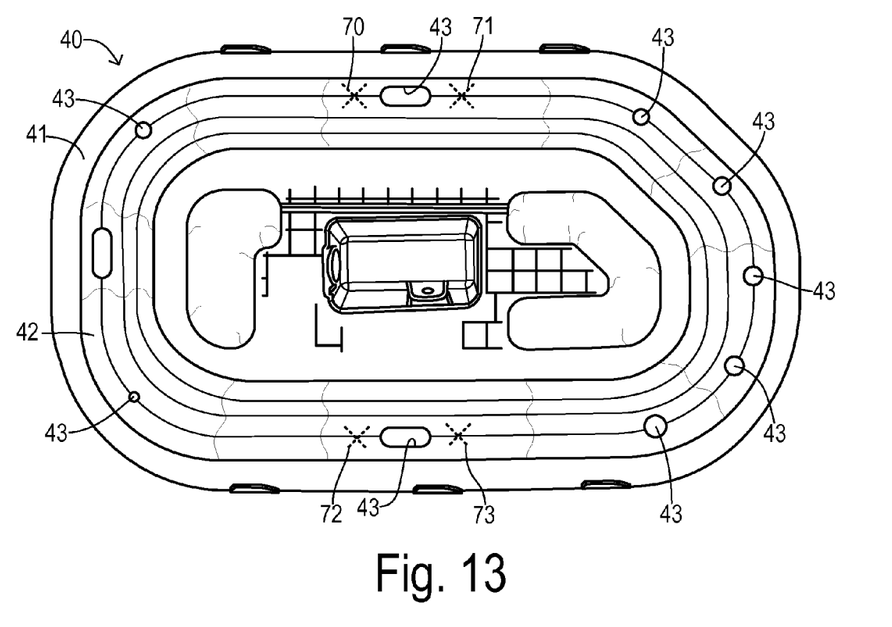
FIG. 13 is a rear, plan view of a bladder member with a plurality of vent openings and stress relief vents distributed around an outermost pleat.

FIG. 13 illustrates placement of a plurality of stress relief events 70-73 according to the stress concentration areas of bladder member 40. Since upper and lower edges of bladder member 40 are stress concentration areas, stress relief events 70-73 are disposed in bladder member 40 juxtaposed with those concentration areas.

Figure 14:
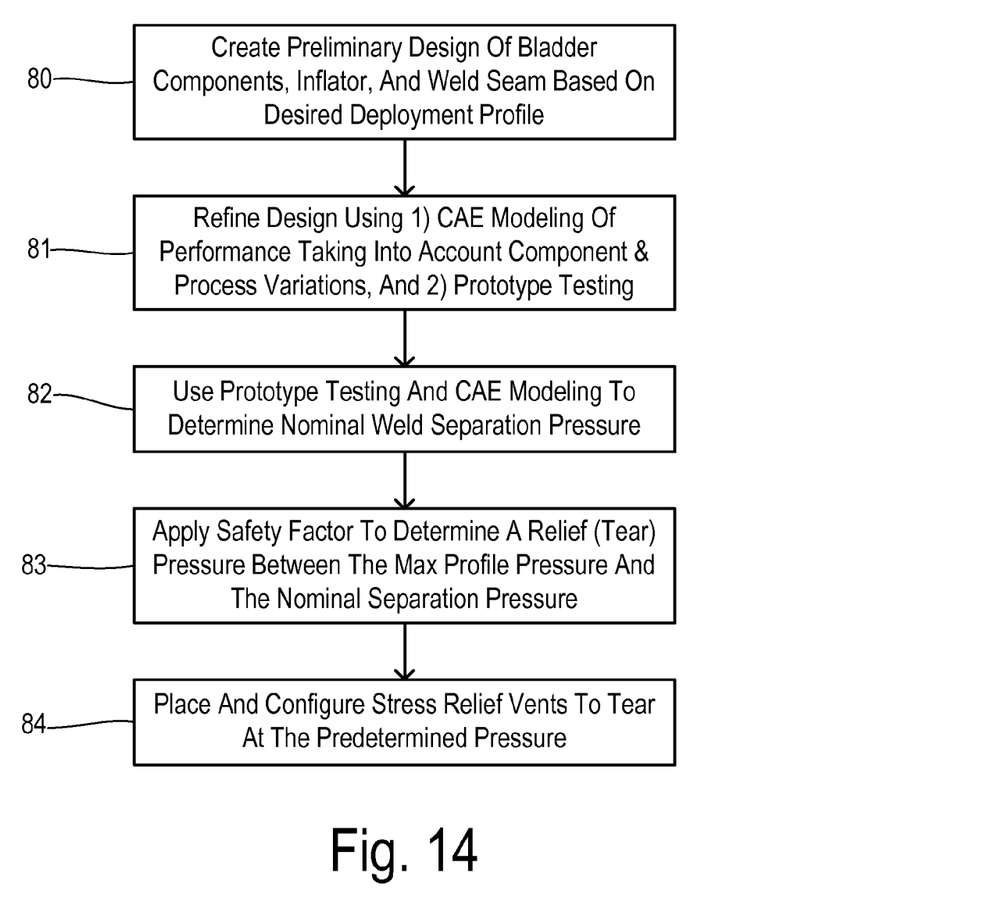
FIG. 14 is a flowchart showing one embodiment of a method for configuring stress relief vents of the invention.

FIG. 14 shows one embodiment of a method for deriving and configuring a design independently providing both normal venting and failsafe stress relief venting. In step 80, a preliminary design is created for the bladder components, inflator, and the weld seam based on a desired deployment profile and other performance specifications as known in the art. In step 81, the design is refined using CAE modeling of performance taking into account the component specifications and manufacturing process variations, for example. The design is further refined using prototype testing. Once the design has progressed to a stage where the normal venting has been configured, then prototype testing and/or CAE modeling are used in step 82 to determine a nominal weld separation pressure. The nominal separation pressure may represent a pressure at a weakest point of the weld seam coincident with failure of the weld, for example.

In step 83, a safety factor is applied to the separation pressure characterized in step 82 in order to predetermine a relief (tear) pressure between the profile pressure (e.g., maximum) and the nominal separation pressure. In step 84, stress relief vents are placed and configured in order to frangibly tear open at the predetermined tear pressure.

What is claimed is:

1. An active bolster for mounting at an interior trim surface of a passenger compartment in an automotive vehicle, comprising:
   a plastic-molded front wall for deploying in a deployment direction toward a passenger in the passenger compartment;
   a plastic-molded expandable bladder member joined along an outer perimeter with the front wall by a weld seam to form an inflatable bladder, wherein the weld seam has a nominal separation pressure; and
   an inflator for coupling an inflation gas into the inflatable bladder in response to a crash event of the vehicle;
   wherein the bladder member includes a plurality of vent openings configured to regulate an inflation pressure of the inflation gas during an impact according to a passenger restraint profile; and
   wherein the bladder member includes at least one stress relief vent comprising a frangible tear seam partially cut into the bladder member configured to tear open at a predetermined pressure between the passenger restraint profile and the nominal separation pressure.

2. The active bolster of claim 1 wherein the bladder member includes at least one substantially circumferential pleated baffle inwardly disposed from the weld seam, and wherein the stress relief vent is located in the baffle proximate to one of the vent openings.

3. The active bolster of claim 1 wherein the frangible tear seam extends laterally from one of the vent openings.

4. The active bolster of claim 1 wherein the stress relief vent further comprises an initiator hole, and wherein the frangible tear seam extends laterally from the initiator hole.

5. The active bolster of claim 4 wherein the stress relief vent comprises a plurality of frangible tear seams extending laterally from the initiator hole.

6. The active bolster of claim 1 wherein the weld seam has a plurality of stress concentration areas, and wherein the bladder member includes a plurality of stress relief vents disposed in the bladder member each juxtaposed with a respective stress concentration area.

7. An inflatable bladder for an active bolster, comprising:
   a trim wall; and
   an expandable bladder wall with a perimeter welding flange welded to the trim wall, the bladder wall having vent openings regulating an inflation pressure of an inflation gas during an impact according to a restraint profile and having a relief vent comprising a frangible tear seam configured to tear open at a predetermined pressure between the restraint profile and a weld separation pressure.

8. The bladder of claim 7 wherein the tear seam is partially cut into a surface of the bladder wall.

9. The bladder of claim 7 wherein the bladder wall includes at least one substantially circumferential pleated baffle inwardly disposed from the welding flange, and wherein the relief vent is located in the baffle proximate to one of the vent openings.

10. The bladder of claim 7 wherein the frangible tear seam extends laterally from one of the vent openings.

11. The bladder of claim 7 wherein the relief vent further comprises an initiator hole, and wherein the frangible tear seam extends laterally from the initiator hole.

12. The bladder of claim 11 wherein the relief vent comprises a plurality of frangible tear seams extending laterally from the initiator hole.

13. The bladder of claim 7 wherein a weld seam formed at the welding flange has a plurality of stress concentration areas, and wherein the bladder wall includes a plurality of relief vents disposed in the bladder wall each juxtaposed with a respective stress concentration area.

* * * * *